C. O. ERICSON.
GRADE METER.
APPLICATION FILED MAR. 28, 1919.

1,360,102.

Patented Nov. 23, 1920.

INVENTOR
Charles O. Ericson
BY
W. P. Hutchinson,
ATTORNEY

UNITED STATES PATENT OFFICE.

CHARLES OSCAR ERICSON, OF HELMETTA, NEW JERSEY.

GRADE-METER.

1,360,102.  Specification of Letters Patent.  Patented Nov. 23, 1920.

Application filed March 28, 1919. Serial No. 285,812.

*To all whom it may concern:*

Be it known that I, CHARLES OSCAR ERICSON, a citizen of the United States, and a resident of Helmetta, Middlesex county, New Jersey, have invented a new and useful Improvement in Grade-Meters, of which the following is a full, clear, and exact description.

My invention relates to improvements in grade meters for use on automobiles, locomotives, airships, and other traveling appliances, indicating either in degrees or percentage the grade up or down at which the vehicle is traveling. The object of my invention is to produce a simple, inexpensive, sensitive, and accurate instrument of the kind referred to, which can be easily applied, which operates without gears and therefore with little friction, and in which the indicating hand moves at right angles to the pendulum member so that the instrument can be conveniently placed on the dashboard or similar part in front of the driver so that the pendulum will swing in a plane of the line of travel, while the hand will move at right angles and so be easily discernible to the driver. My invention is also intended to produce a structure which has its operating parts so simple and arranged in such a manner that it is dependable and not likely to get out of order. My invention is further intended to provide a hollow bracket for the pendulum member which can serve as a cup so that if desired liquid may be inserted in which the pendulum will move so as to steady the movement thereof. My invention also is intended to improve certain other details of construction which will appear clearly from the description which follows.

Reference is to be had to the accompanying drawings forming a part of this specification, in which similar reference characters indicate corresponding parts in all the views.

Figure 1:
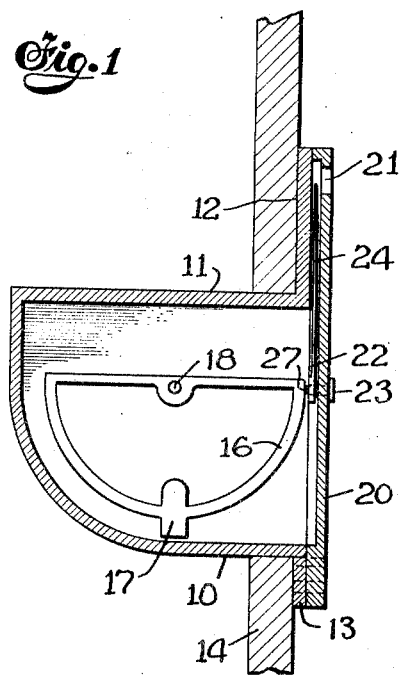
Figure 1 is a sectional elevation of the apparatus as applied to a dashboard or similar support.
Figure 2:
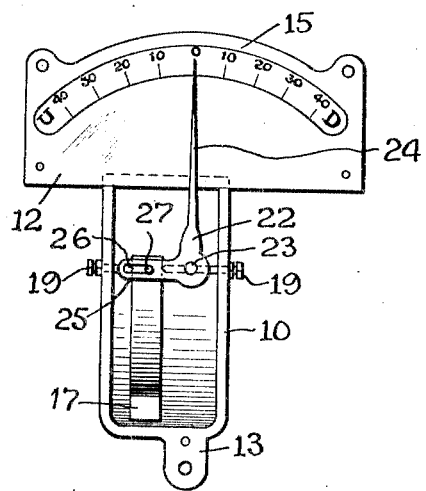
Fig. 2 is a front elevation of the apparatus with the face plate removed.
Figure 3:
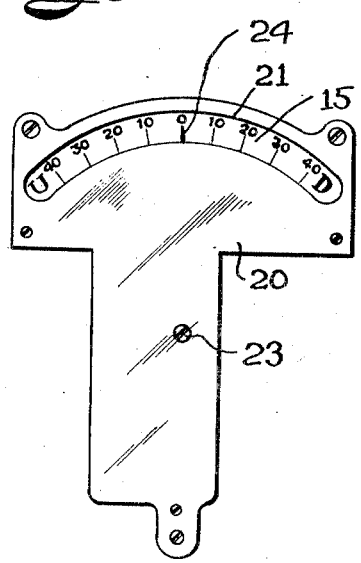
Fig. 3 is a front view with the face plate in place.

A hollow cup-shaped bracket 10 is used which has preferably a flat top 11 and vertical flanges 12 and 13 at the upper and lower sides by means of which it can be fastened to a dashboard 14 or the like, with the cup portion extending through the same, as shown clearly in Fig. 1. On the front of the flange 12 is a table or scale 15 which can be made to indicate the degrees or percentage as desired, and which preferably has the zero mark indicating a level position located near the center of the table, and with the degrees or percentage marks up or down at the sides of the zero mark.

Within the cup of the bracket is arranged a pendulum member 16, preferably in the form of a sector which can be weighted at the bottom as shown at 17, if desired, and is detachably pivoted near the top, having preferably sockets 18 to receive the pivot screws 19 which are tapered at their inner ends so as to give a sensitive bearing, but obviously the pendulum member can be pivoted in any way which will permit it to swing freely.

The front of the bracket is closed by a face-plate 20 which has an opening 21 therein to expose the table 15, and on the back of the face-plate opposite the upper portion of the pendulum member 16 is a bell-crank lever 22 which is pivoted as shown at 23, and has the upper part formed into an indicating hand 24 moving over the table 15, while the horizontal arm of the bell-crank is slotted as shown at 26 to receive a pin 27 on the front upper portion of the member 16. Thus it will be seen that the oscillations of the pendulum member 16 will be communicated to the bell-crank so as to move the hand 24 to the right or left, according as the grade is up or down.

It will be seen that this makes a very simple arrangement and permits the table 15 and the hand 24 to be directly in front of the driver, while the pendulum member 16 is at right angles and swinging in the plane of the line of travel. It will also be noticed that there are no gears to cause friction or to stick and make the apparatus erratic and uncertain in its work, but the oscillations are directly and freely transmitted from the pendulum member to the indicating hand.

If the pendulum member swings too freely for any particular purpose, the cup of the bracket 10 can be filled or partly filled with liquid to steady the movement of the pendulum member.

Figure 4:
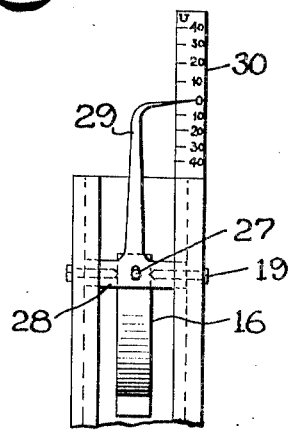
Fig. 4 is a broken front elevation showing a slight modification of the device.

Obviously the table can be differently arranged, the indicating hand can be made to move differently, and the details of construction can be changed considerably without affecting the invention. For instance in Fig. 4 I have shown the pin 27 connecting with a vertically movable cross-head 28 which is moved by the swinging of the pendulum member 16, while a hand 29 carried by the cross-head moves over a vertical table 30.

In either case it will be seen that I retain the simplicity and accuracy of movement, and that the structure is of a kind easy to make and reliable in use.

I claim:

1. A grade meter comprising a swinging pendulum member, a bell-crank swinging in a plane at right angles to the movement of the pendulum member, one arm of said bell-crank constituting a hand which moves over an indicating scale, and a connection between the second arm of the bell-crank and the pendulum member whereby the movements of the pendulum member tilt the bell-crank.

2. A grade meter comprising an integral bracket having a vertical flange and a cup projecting from the back of the flange, said bracket having a scale thereon, a segmental pendulum swinging in the cup, a face-plate covering the front of the bracket and having an opening therein opposite the scale, a bell crank pivoted on the face plate, one arm of the bell crank constituting the hand which moves opposite the scale, and a connection between the second arm of the bell crank and the pendulum whereby the swinging of the pendulum moves the bell crank.

CHARLES OSCAR ERICSON.

Witnesses:
HARRY L. EMMONS,
J. AUGUSTUS THOMPSON.